M. L. KELLER.
CARBURETER FOR EXPLOSIVE ENGINES.
APPLICATION FILED OCT. 28, 1913.
1,129,103.
Patented Feb. 23, 1915.
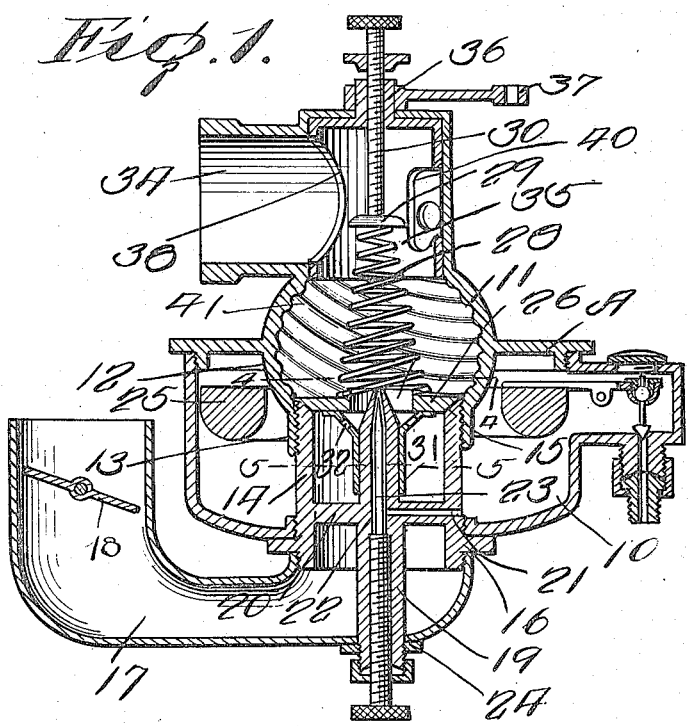
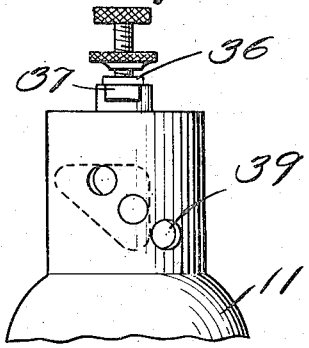
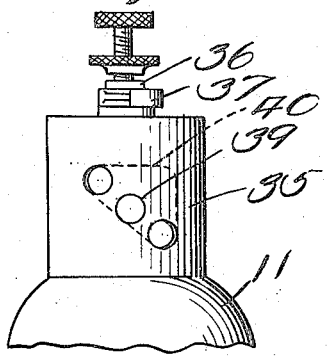
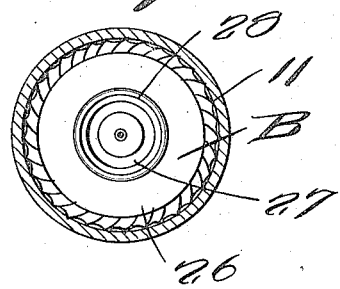
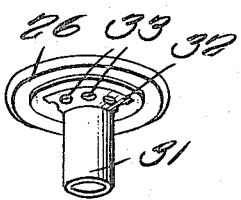
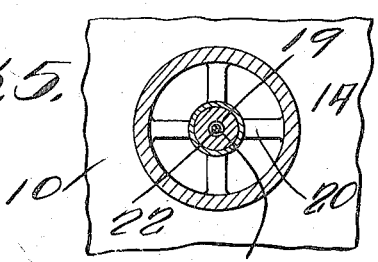
Inventor
M. L. Keller

UNITED STATES PATENT OFFICE.

MARCUS L. KELLER, OF TOONE, TENNESSEE.

CARBURETER FOR EXPLOSIVE-ENGINES.

1,129,103.

Specification of Letters Patent. Patented Feb. 23, 1915.

Application filed October 28, 1913. Serial No. 797,793.

*To all whom it may concern:*

Be it known that I, MARCUS L. KELLER, a citizen of the United States, residing at Toone, in the county of Hardeman, State of Tennessee, have invented certain new and useful Improvements in Carbureters for Explosive-Engines; and I do hereby declare the following to be a full, clear, and exact description of the invention, such as will enable others skilled in the art to which it appertains to make and use the same.

This invention relates to carbureters for explosive engines.

The object of the invention resides in the provision of a carbureter in which only a portion of the air drawn in through the air intake will sweep the gasolene nozzle, the portion of the air which does not directly engage and take up the gasolene uniting with the mixture permeated with gasolene in the mixing chamber of the carbureter between the gasolene nozzle and the manifold of the engine.

A further object of the invention resides in the provision of a carbureter embodying an improved form of air valve for effecting the introduction of air into the carbureter in two separate portions one of which is adapted to sweep the gasolene nozzle and the other to enter the mixing chamber and there unite with the mixture formed by the first named portion of air and the gasolene taken up thereby.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a vertical section through a carbureter constructed in accordance with the invention; Fig. 2, a view looking at the right hand side of Fig. 1; Fig. 3, a view similar to Fig. 2 showing the relation of the auxiliary air ports of the throttle and casing when the throttle is fully opened; Fig. 4, a section on the line 4—4 of Fig. 1; Fig. 5, a section on the line 5—5 of Fig. 1, and Fig. 6, a detail perspective view of the air valve detached.

Referring to the drawings the carbureter is shown as comprising a casing A which includes a gasolene reservoir 10 and a mixing chamber 11 which communicates with the manifold of the engine. The wall of the mixing chamber 11 is curved outwardly from its upper end and then curved inwardly as at 12 into the reservoir 10. The extreme lower end of the wall of the mixing chamber terminates in an interiorly threaded cylindrical portion 13 in which is screwed a valve seat 14 having a beveled inner end 15 and a laterally directed outer end 16 bearing against the bottom of the casing A, it being understood that the bottom of the casing A is provided with a suitable opening for the insertion of the valve seat 14. Disposed against the bottom of the valve seat 14 is an air intake pipe 17 provided with a damper 18 at its free end.

Extending through the pipe 17 and longitudinally through the valve seat 14 is a gasolene nozzle 19 which is provided with spider arms 20 united to the inner wall of the valve seat 14, one of said arms being provided with a passage 21 which communicates at one end with the bore of the nozzle 19 and at its other end with a passage 22 formed in the wall of the valve seat and which last named passage communicates with the gasolene reservoir 10. Flow of gasolene through the nozzle 19 is controlled by a needle valve 23 mounted to operate in the bore of the nozzle 19. The nozzle 19 is provided with a circumscribing flange 24 which bears against the pipe 17 and serves to hold the latter in place and at the same time permitting radial adjustment of said pipe. Pivotally mounted in the gasolene reservoir 10 is a float valve 25 which controls the supply of gasolene to the reservoir in the usual and well known manner. Disposed within the mixing chamber 11 is an air valve B which embodies a disk 26 having a central opening 27. This disk 26 normally seats against the beveled end 15 of the valve seat 14 and is held in this position by a spring 28 which bears at one end against said disk and at its other end against a flange 29 formed on an adjusting screw 30 threaded in the top wall of the casing A and by means of which the tension of the spring 28 may be adjusted. Secured to the bottom of the disk 26 is a tubular member including a cylindrical portion 31 slidable on the nozzle 19 and a flared portion 32 which is directly connected to the bottom of the disk 26 and provided with a plurality of air ports 33. The cylindrical portion 31 of the tubular member serves to guide the disk 26 in its movements to and from the valve seat 14. The mixing chamber 11 terminates in a laterally directed portion 34 and disposed within this mixing chamber above the disk 26 and in line with the bore of the lateral portion 34 is a cylindrical throttle 35 which is provided with a bearing stem 36 rotatably mounted in the top wall of the casing. Secured to this bearing stem 36 is a throttle lever 37. The lower end of the throttle 35 is opened so that the interior of the throttle communicates with the mixing chamber 11. The side wall of the throttle 35 is provided with an opening 38 which is adapted to be brought into and out of registration with the bore of the extension 34 by the rotation of the throttle through the instrumentality of the lever 37. Formed in the side wall of the mixing chamber in line with the bore of the extension 34 is a plurality of ports 39 with which a port 40 formed in the throttle 35 is adapted to successively register when the throttle is moved to full open position.

In the operation of the carbureter it will be apparent that when the engine is running slow little or no lift would be exerted upon the disk 26 so that all air will pass through the ports 33 and sweep the gasolene nozzle 19 at its delivery end. As the speed of the engine increases however upon opening the throttle or advancing the spark the richness of the mixture must be materially decreased and as such increase of speed will lift the disk 26 sharply from its seat air will sweep between the outer edge of the disk and the upper end of the seat 14 in addition to passing through the ports 33. This air that passes between the edges of the disk 26 and the seat 14 will unite with the mixture formed by the air passing through the ports 33 and sweeping the gasolene nozzle and thus materially decrease the richness of such mixture. The richness of the mixture is adapted to be further decreased as the throttle is opened by air drawn through the registering ports 39 and 40, the quantity of such air being proportionate to the extent to which the throttle is opened.

The mixture of air and gasolene in the mixing chamber 11 is enhanced by providing the wall of said mixing chamber with spiral corrugations 41 which serve to impart a whirling or rotary motion to the air entering the chamber.

What is claimed is:

A carbureter comprising a casing having a liquid fuel chamber and a mixing chamber, said mixing chamber having a portion of its wall extended into the fuel chamber, a valve seat threaded in the extended portion of the wall of the mixing chamber and through the wall of the fuel chamber, said valve seat forming an air intake for the mixing chamber, a fuel nozzle mounted longitudinally of the valve seat, a spring controlled valve supported on the valve seat and comprising a disk having a central opening through which the fuel nozzle projects, and a tubular portion slidable on the fuel nozzle having its inner end flared and connected to the disk, said inner end being provided with air ports.

In testimony whereof, I affix my signature, in the presence of two witnesses.

MARCUS L. KELLER.

Witnesses:
S. P. HARRIS,
T. H. RANSOM.